United States Patent
Seekircher

(10) Patent No.: US 6,834,563 B2
(45) Date of Patent: Dec. 28, 2004

(54) SHIFTING SYSTEM AND METHOD FOR A MOTOR VEHICLE TRANSMISSION

(75) Inventor: Juergen Seekircher, Ostfildern (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/183,999

(22) Filed: Jun. 28, 2002

(65) Prior Publication Data

US 2003/0010145 A1 Jan. 16, 2003

(30) Foreign Application Priority Data

Jun. 29, 2001 (DE) .......................................... 101 31 433

(51) Int. Cl.[7] .............................................. F16H 59/00
(52) U.S. Cl. .................... 74/336 R; 74/335; 74/473.21; 74/473.31; 74/473.22; 192/220.2
(58) Field of Search ............... 74/336 R, 335, 74/473.3, 473.31, 473.21, 473.22, 540, 541; 192/220.2

(56) References Cited

U.S. PATENT DOCUMENTS

| | | | | |
|---|---|---|---|---|
| 4,805,476 A | * | 2/1989 | Beauch et al. ........... | 74/473.31 |
| 5,025,678 A | * | 6/1991 | Shinpo et al. ........... | 74/473.31 |
| 5,916,291 A | * | 6/1999 | McKee ..................... | 701/55 |
| 6,120,412 A | * | 9/2000 | Fujinuma .................. | 477/99 |
| 6,378,395 B1 | * | 4/2002 | Kataumi et al. .......... | 74/473.31 |
| 6,532,842 B1 | * | 3/2003 | Arai et al. ................ | 74/473.31 |
| 6,647,822 B2 | * | 11/2003 | Ritchie et al. ........... | 74/473.31 |
| 6,698,308 B2 | * | 3/2004 | Vogel et al. .............. | 74/473.32 |
| 6,699,155 B2 | * | 3/2004 | Nagasaka .................. | 477/94 |

FOREIGN PATENT DOCUMENTS

| | | | | |
|---|---|---|---|---|
| DE | 3924318 A1 | | 1/1991 | |
| JP | 10157482 A | * | 6/1998 | ........... B60K/20/06 |

* cited by examiner

Primary Examiner—Rodney H. Bonck
Assistant Examiner—David D. Le
(74) Attorney, Agent, or Firm—Crowell & Moring LLP

(57) ABSTRACT

A shifting system for a motor vehicle transmission shifts the transmission into the neutral and returns a steering column shift lever to the neutral position from the reverse position, when the vehicle speed is above a pre-determined positive value and the shift lever is shifted into the reverse position. The system may further shift the transmission into the neutral and returns the steering column shift lever to the neutral position from the forward drive position, when vehicle speed is below a pre-determined negative value and the shift lever is shifted into the forward drive position.

20 Claims, 2 Drawing Sheets

US 6,834,563 B2

SHIFTING SYSTEM AND METHOD FOR A MOTOR VEHICLE TRANSMISSION

This application claims the priority of German Patent Document No. DE 101 31 433.7, filed Jun. 29, 2001, the disclosure of which is expressly incorporated by reference herein.

BACKGROUND AND SUMMARY OF THE INVENTION

The invention relates to a shifting system and method for a motor vehicle transmission.

German Patent Document DE 39 24 318 A1 discloses a shifting system for a motor vehicle transmission which comprises a steering column shift lever which can be moved in two directions arranged orthogonal with respect to one another. The steering column shift lever is changeable along the first direction into at least one forward-drive position (D) as well as an idling position (N) and, along the second direction, into positions for the successive (sequential) gear selection "+", "−".

It is an object of the invention to provide a shifting system which is as cost-effective as possible.

The object is advantageously achieved according to the preferred embodiments of the present invention as described hereinafter.

According to an advantage of the invention, no blocking mechanism is required to prevent a shift from D to R by way of N at relatively high speeds, such as speeds above 3 km/h, in order to prevent damage to the transmission and to implement for the driver a uniformity between the steering column shift lever position and the shifting position engaged in the motor vehicle transmission. The implementation of a mechanical blocking for preventing a movement from D to R would be particularly critical with respect to time. In this context, critical with respect to time means that it would have to be checked extremely rapidly whether a threshold speed value—for example, 3 km/h—is exceeded. When this is determined, the movement from N to R would have to be blocked in a flash. As a result of the invention, such a costly blocking will advantageously be avoided.

According to another advantage of the invention, the driver's selection can be detected as a driving range desire. Shifting systems, called "shift-by-wire systems", have the advantage that, in a simple and cost-effective manner, plausibility controls can be carried out between the motor vehicle transmission and the driver's. Thus, safety-oriented and comfort-oriented parameters can easily intervene in transmission control. In addition, "shift-by-wire systems", the transmission can be freely positioned in relation to the steering column shift lever, and has cost advantages with respect to the development expenditures for model reworking.

Another advantage of the shifting system according to the invention is that it complies with the requirements of various important countries and can therefore be sold without modifications in those countries and therefore in large quantities.

Another advantage is the fact that space becomes available because the shift lever does not have to be disposed on the center console. This space can particularly advantageously be used for a holder for beverage cans/bottles which, especially in the U.S., is an advantage particularly appreciated by the customer. This arrangement also results in cost advantages because of the increased sales.

In accordance with a preferred embodiment of the invention, a haptic feedback is implemented for the vehicle driver.

In accordance with another preferred embodiment of the invention, a change from known systems by the vehicle driver is facilitated because the steering column shift lever has the customary positions P-R-N-D.

In accordance with a particularly cost-effective embodiment of the invention, the not time-critical blocking of the steering column shift lever against a movement into the parking position is prevented by means of a block. This movement is not critical with respect to time because the parking position is normally an end position of the steering column shift lever. Since no position behind the parking position must be operated by the steering column shift lever, in the normal driving operation, the above-mentioned blocking device may always be disengaged. Accordingly, a movement of the steering column shift lever into the parking position is prevented.

Other objects, advantages and novel features of the present invention will become apparent from the following detailed description of the invention when considered in conjunction with the accompanying drawings.

DETAILED DESCRIPTION OF THE DRAWINGS

Figure 1:
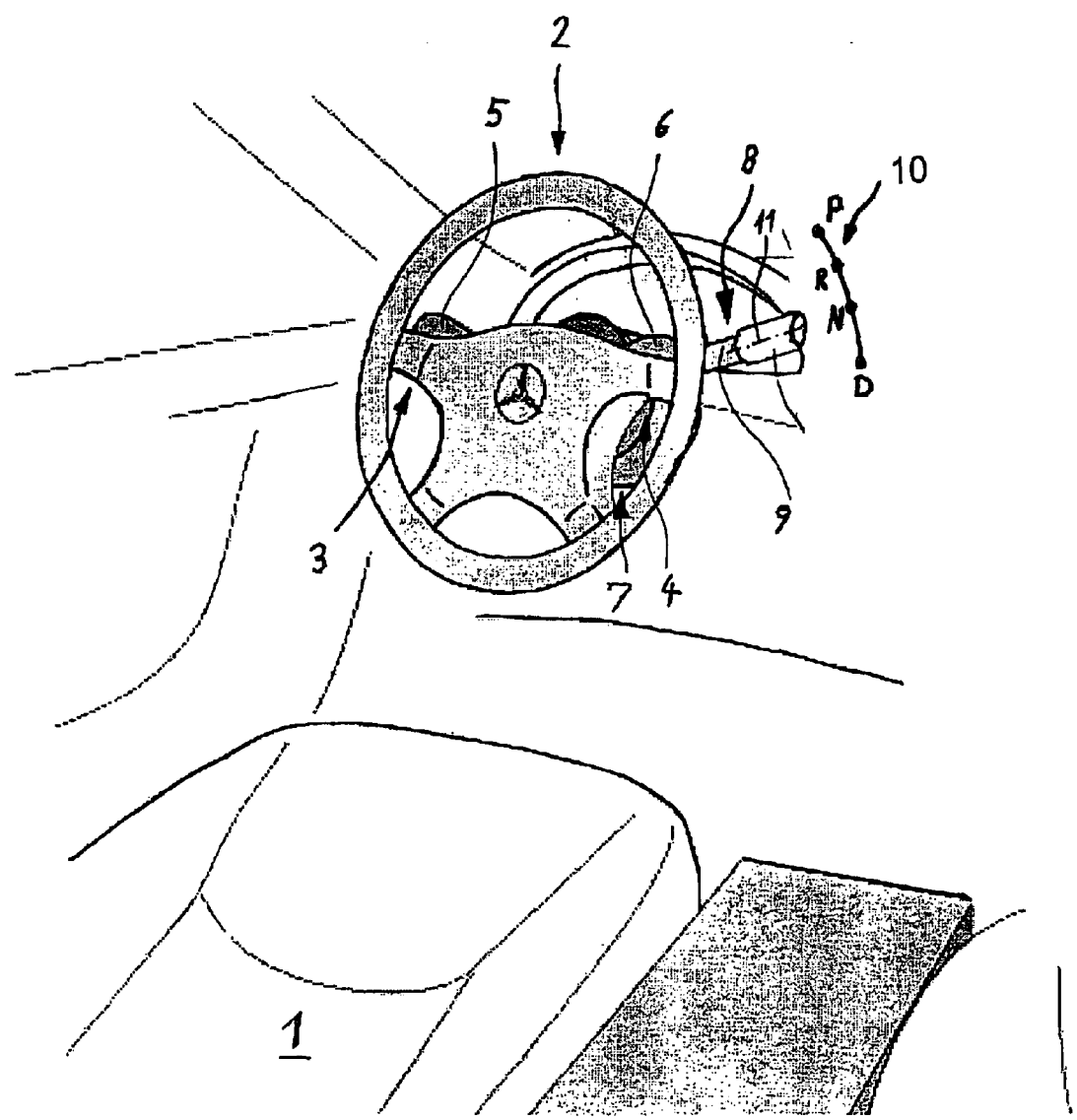
FIG. 1 is a cutout view of a vehicle interior of a motor vehicle with a shifting system and a steeling column.

FIG. 1 is a cutout view of a vehicle interior of a motor vehicle having a motor vehicle transmission not shown in detail.

A vehicle driver (not shown) sits in a vehicle seat 1. The motor vehicle can be steered by means of a steering wheel 2. This steering wheel 2 has steering wheel spokes 3, 4 at which two switches 5, 6 are arranged in the area of a two-thirds position. By means of these switches 5, 6, the transmission can be shifted successively, that is, sequentially. The steering wheel 2 is rotatable relative to a steering column 7. On the right side of the steering column 7 in the driving direction, a lockable steering column shift lever 8 is arranged. This steering column shift lever 8 comprises, among other parts, a carrier tube 9 and a grip piece 11 and is arranged to be swivellable about a swivelling axis 12 illustrated in FIG. 2. This swivelling axis 12 is situated approximately parallel to the axis of rotation of the steering wheel 2.

Figure 2:
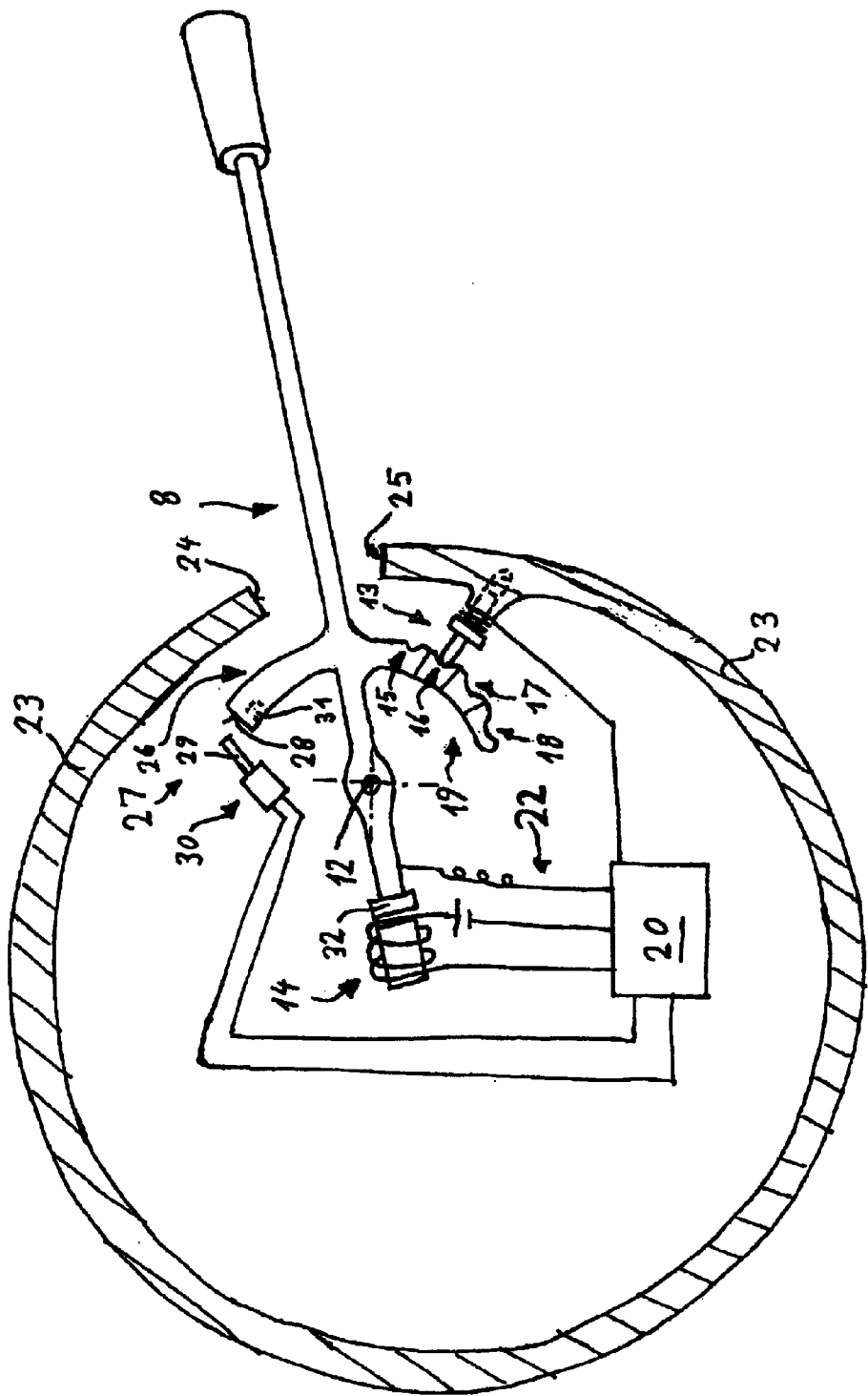
FIG. 2 is a sectional view of the shifting system of FIG. 1 in a sectional representation of the steering column.

Viewed clockwise, a parking position P, a reverse gear position R, an idling position N, and a forward-drive position D are situated successively on a curved course 10 of the steering column shift lever 8. These positions P, R, N, D are all stable. For this purpose, a locking device 13 is provided which is illustrated in FIG. 2. The steering column shift lever remains in the respective position P, R. N or D, if no operating force by the vehicle driver or a restoring force of a solenoid 14 acts upon it.

FIG. 2 illustrates the shifting system in a sectional drawing of the steering column 7 perpendicular to the swivelling axis 12 of the steering column shift lever 8. Here, the components required for the operation of the shifting system are illustrated schematically.

When operated beyond positions P and D, the steering column shift lever 8 is supported on stops 24, 25 of a wall 23 of the steering column.

The locking device 13 comprises a pin which is supported in a spring-elastically prestressed manner on the wall 23 and engages in depressions 15, 16, 17, 18 of a curved shift lever arm 19 arranged concentrically with respect to the swivelling axis 12. Each of the depressions 15, 16, 17, 18 corresponds with one of the positions P, R, N, D. Because of various electric resistances in the area of the depressions 15, 16, 17, 18, the engaged position P, R, N or D can be determined by a control device 20. For this purpose, a current can be applied to two lines 21 and 22 by the control device 20.

The control device 20 transmits the signals to the motor vehicle transmission which has a range selection shaft not shown in detail which is rotated by means of an electric-motor actuator. The ranges selected by means of this range selection shaft correspond to positions P, R, N, D of the steering column shift lever 8.

Another shift lever arm 26, which has a blocking device 27, is arranged opposite the shift lever arm 19. This blocking device 27 also comprises an actuator 30 with an axially displaceable piston rod 29. As long as a critical speed of, for example, 8 km/h is exceeded, the actuator remains disengaged so that a face 28 of the additional shift lever arm 26 during the swivelling of the steering column shift lever 8 in the direction pointing to the parking position P is supported on the piston rod 29. This prevents the engaging of the parking position at speeds of above 8 km/h. At speeds below 8 km/h, the piston rod 29 is engaged and the steering column shift lever 8 can be swivelled into the parking position P. For fixing the steering column shift lever 8, the control device 20 triggers the actuator 30, disengaging the latter, so that the piston rod 29 engages in a blind-hole bore 31 of the additional shift lever arm 26 and secures the steering column shift lever 8 against swivelling movements. When the steering column shift lever 8 is secured in this manner, the motor vehicle can be parked and an ignition key can be removed from the ignition lock.

When, during a forward drive at a speed above a threshold value of, for example, 3 km/h, the steering column shift lever 8 is operated from the forward-drive position D by way of the idling position N into the reverse gear position R, the control device 20, which is in possession of the actual speed by way of a serial data bus, supplies to the electric-motor actuator for operating the range selection shaft the signal for rotating the range selection shaft into the idling position N. Furthermore, the control device 20 energizes a coil which activates the solenoid 14 whose electrical field swivels a ferromagnetic end 32 of the steering column shift lever 8 from the reverse gear position R back into the idling position N. Thus, the positions of the range selection shaft are the same at the motor vehicle transmission and at the steering column shift lever 8.

The control device 20 will also place the motor vehicle transmission in the neutral position and energize the above-mentioned coil to place the shift lever 8 in neutral when, during a drive in reverse at a high speed (for example, above 3 km/h), the vehicle driver pulls the steering column shift lever 8 from R to D by way of N.

The transmission may be constructed as an automatic planetary transmission, as an automated reduction gear, and as an infinitely variable speed transmission.

In another embodiment, the steering column shift lever can be swivelled about two orthogonal axes. Here, a sequential (+/−) shifting course of the steering column shift lever is arranged perpendicular to the curved course of the steering column shift lever.

Instead of having a necessarily sequential shiftability, the switches on the steering wheel spokes as well as a sequential (+/−) shifting course of the steering column shift lever can be constructed as an upshift limit. In the case of such an upshift limit, the vehicle driver indicates the gear which can be maximally shifted by a shifting program. In other words, the transmission shifts into the optimal gear also in the manual mode, but only to the sequentially defined gear.

In addition to the stable position of the steering column shift lever illustrated in the embodiment in the parking position at the end of the curved course, the grip piece may also be axially displaceable with respect to the supporting tube. In this case, a displacement of the grip piece into the direction pointing toward the center of the steering wheel will engage the parking position. The parking position may be stable or unstable, that is, the grip piece will engage the parking position when pressed in the direction toward the steering wheel and will be released when being pressed again. Instead of the grip piece, a parking position switch may be arranged at the end of the supporting tube for actuating the parking position.

Depending on the shifting approach, "+" may also be arranged on the left and "−" may be arranged on the right on the steering wheel spokes.

The described embodiments are only examples. A combination of the described characteristics for different embodiments is also conceivable. Additional, particularly not described characteristics of the system parts pertaining to the invention are indicated in the geometries of the system parts illustrated in the drawings.

What is claimed:

1. A shifting system for a motor vehicle transmission, comprising:
    a steering column shift lever which can be moved along
        a direction at least into
        a stable forward drive position,
        a stable idling position, and
        a stable reverse gear position; and
    wherein these positions are detectable for the operation of the motor vehicle transmission, and the steering column shift lever is automatically movable into the idling position.

2. The shifting system according to claim 1, wherein the steering column shift lever is held in any one of the above-mentioned stable positions by a locking device.

3. The shifting system according to claim 2, wherein the steering column shift lever can be moved into a parking position.

4. The shifting system according to claim 3, wherein the shifting system has a blocking device by which the steering column shift lever can be mechanically blocked against a movement into the parking position.

5. The shifting system according to claim 4, wherein the steering column shift lever can be fixed in the parking position by the above-mentioned blocking device.

6. The shifting system according to claim 1, wherein the steering column shift lever can be moved into a parking position.

7. The shifting system according to claim 6, wherein the shifting system has a blocking device by which the steering column shift lever can be mechanically blocked against a movement into the parking position.

8. The shifting system according to claim 7, wherein the steering column shift lever can be fixed in the parking position by the above-mentioned blocking device.

9. A shifting system for a motor vehicle transmission having a forward drive, a neutral, and a reverse, the shifting system comprising:

a steering column shift lever having
- a forward drive position,
- a neutral position, and
- a reverse position; and wherein these positions are detectable for the operation of the motor vehicle transmission, and wherein when vehicle speed is above a pre-determined positive value and the shift lever is shifted into the reverse position, the transmission is blocked from moving into the reverse, and the steering column shift lever is automatically shifted into the neutral position from the reverse position.

10. The shifting system according to claim 9, wherein when vehicle speed is below a pre-determined negative value and the shift lever is shifted into the forward drive position, the transmission is blocked from moving into the forward drive, and the steering column shift lever is automatically shifted into the neutral position from the forward drive position.

11. The shifting system according to claim 9, wherein the steering column shift lever has a parking position.

12. The shifting system according to claim 11, further comprising a blocking device by which the steering column shift lever is mechanically blocked against a movement into the parking position under certain operating conditions.

13. The shifting system according to claim 12, wherein the steering column shift lever is fixed in the parking position by the blocking device under certain operating conditions.

14. A shifting system for a motor vehicle transmission having a forward drive, a neutral, and a reverse, the shifting system comprising:

a steering column shift lever having
- a forward drive position,
- a neutral position, and
- a reverse position; and wherein these positions are detectable for the operation of the motor vehicle transmission, and when vehicle speed is below a pre-determined negative value and the shift lever is shifted into the forward drive position, the transmission is blocked from moving into the forward drive, and the steering column shift lever is automatically shifted into the neutral position from the forward drive position.

15. The shifting system according to claim 14, wherein the steering column shift lever has a parking position.

16. The shifting system according to claim 14, further comprising a blocking device by which the steering column shift lever is mechanically blocked against a movement into the parking position under certain operating conditions.

17. The shifting system according to claim 16, wherein the steering column shift lever is fixed in the parking position by the blocking device under certain operating conditions.

18. A method for controlling a shifting system for a motor vehicle transmission, the method comprising:

shifting the transmission into a neutral of the transmission and returning a steering column shift lever to a neutral position of the steering column shift lever from a reverse position of the steering column shift lever, when vehicle speed is above a pre-determined positive value and the shift lever is shifted into the reverse position.

19. The method according to claim 18, shifting the transmission into the neutral of the transmission and returning the steering column shift lever to the neutral position of the steering column shift lever from a forward drive position of the steering column shift lever, when vehicle speed is below a pre-determined negative value and the shift lever is shifted into the forward drive position.

20. A method for controlling a shifting system for a motor vehicle transmission, the method comprising:

shifting the transmission into a neutral of the transmission and returning a steering column shift lever to a neutral position of the steering column shift lever from a forward drive position of the steering column shift lever, when vehicle speed is below a pre-determined negative value and the shift lever is shifted into the forward drive position.

* * * * *